US012700225B2

(12) United States Patent
Piergiovanni et al.

(10) Patent No.: US 12,700,225 B2
(45) Date of Patent: Aug. 4, 2026

(54) CHANNEL FUSION FOR VISION-LANGUAGE REPRESENTATION LEARNING

(71) Applicant: Google LLC, Mountain View, CA (US)

(72) Inventors: Anthony J. Piergiovanni, Denver, CO (US); Maxwell Mbabilla Aladago, Hanover, NH (US)

(73) Assignee: GOOGLE LLC, Mountain View, CA (US)

( * ) Notice: Subject to any disclaimer, the term of this patent is extended or adjusted under 35 U.S.C. 154(b) by 328 days.

(21) Appl. No.: 18/476,037

(22) Filed: Sep. 27, 2023

(65) Prior Publication Data

US 2024/0119713 A1    Apr. 11, 2024

Related U.S. Application Data

(60) Provisional application No. 63/410,474, filed on Sep. 27, 2022.

(51) Int. Cl.
*G06V 10/80* (2022.01)
*G06V 10/774* (2022.01)
*G06V 10/82* (2022.01)
*G06V 30/19* (2022.01)

(52) U.S. Cl.
CPC ............ *G06V 10/80* (2022.01); *G06V 10/774* (2022.01); *G06V 30/19147* (2022.01); *G06V 30/1918* (2022.01)

(58) Field of Classification Search
None
See application file for complete search history.

(56) References Cited

U.S. PATENT DOCUMENTS

| | | | | |
|---|---|---|---|---|
| 2021/0151034 A1* | 5/2021 | Hasan | ...................... | G06F 40/30 |
| 2022/0245391 A1* | 8/2022 | Badjatiya | ............... | G06V 20/70 |
| 2024/0257550 A1* | 8/2024 | Rebecq | ................ | G06V 30/412 |

OTHER PUBLICATIONS

Tan, Hao., Bansal, Mohit. "LXMERT: Learning Cross-Modality Encoder Representations from Transformers." Nov. 3-7, 2019. Conference on Empirical Methods in Natural Language Processing and the 9th International Joint Conference on Natural Language Processing. pp. 5100-5111. (Year: 2019).*

(Continued)

*Primary Examiner* — Amandeep Saini
*Assistant Examiner* — Caroline Tabancay Duffy
(74) *Attorney, Agent, or Firm* — DORITY & MANNING P.A.

(57) ABSTRACT

Provided is an approach that aligns multi-modal tokens using cross-attention without losing the advantages of global self-attention. In contrast to previous works that concatenate the unimodal tokens along the sequence dimension, example approaches described herein align per-modality tokens by chaining them along the channels. Specifically, the tokens from one modality can be used to query the other modality and the output can be concatenated with the query tokens on the channels. An analogous process can also be repeated (or performed in parallel) where the roles of the two modalities are switched. The resulting sets of compound tokens can be concatenated and fed into a self-attention encoder such as a transformer encoder that performs self-attention.

18 Claims, 5 Drawing Sheets

(56)                    References Cited

OTHER PUBLICATIONS

Li, Harold Liunian., Yatskar, Mark., Yin, Da., Hsieh, Cho-Jui., Chang, Kai-Wei. "Visualbert: A Simple and Performant Baseline for Vision and Language." Aug. 9, 2019. arXiv: 1908.03557v1 (Year: 2019).*

Powalski, R. et al. (2021). Going Full-TILT Boogie on Document Understanding with Text-Image-Layout Transformer. In S. Uchida, D. Lopresti, & J. Lladós (Eds.), Document Analysis and Recognition—ICDAR 2021 (vol. 12822, pp. 732-747). https://doi.org/10.1007/978-3-030-86331-9_47. (Year: 2021).*

Alayrac et al., "Flamingo: A Visual Language Model for Few-Shot Learning.", arXiv:2204.14198v2, Nov. 15, 2022, 20 pages.

Aldago et al., "Compound Tokens: Channel Fusion for Vision Language Representation Learning.", arXiv:2212.01447v1, Dec. 2, 2022, 16 pages.

Anderson et al., "Bottom-Up and Top-Down Attention for Image Captioning and Visual Question Answering.", arXiv:1707.07998v3, Mar. 14, 2018, 15 pages.

Antol et al., "VQA: Visual Question Answering.", arXiv:1505.00468v7, Oct. 27, 2016, 25 pages.

Bao et al., "VLMo: Unified Vision-Language Pre-Training with Mixture-of-Modality-Experts.", arXiv:2111.02358v2, May 27, 2022, 16 pages.

Brown et al., "Language Models are Few-Shot Learners.", arXiv:2005.14165v4, Jul. 22, 2020, 75 pages.

Bugliarello et al., "Multimodal Pretraining Unmasked: A Meta-Analysis and a Unified Framework of Vision- and-Language BERTs.", arXiv:2011.15124v2, May 30, 2021, 16 pages.

Changpinyo et al., "Conceptual 12M: Pushing Web-Scale Image-Text Pre-Training to Recognize Long-Tail Visual Concepts.", arXiv:2102.08981v2, Mar. 30, 2021, 16 pages.

Chen et al., "PaLI: A Jointly-Scaled Multilingual Language-Image Model.", arXiv:2209.06794v4, Jun. 5, 2023, 33 pages.

Chen et al., "UNITER: UNiversal Image-TExt Representation Learning.", arXiv:1909.11740v3, Jul. 17, 2020, 26 pages.

Chen et al., "UTC: A Unified Transformer with Inter-Task Contrastive Learning for Visual Dialog.", arXiv:2205.00423v2, May 3, 2022, arXiv:2205.00423v2, 9 pages.

Cho et al., "Unifying Vision- and-Language Tasks via Text Generation.", arXiv:2102.02779v2, May 23, 2021, 15 pages.

Cubuk et al., "AutoAugment: Learning Augmentation Policies from Data.", arXiv:1805.09501v3, Apr. 11, 2019, 14 pages.

Das et al., "Visual Dialog.", arXiv:1611.086695v5, Aug. 1, 2017, 2 pages.

Deng et al., "ImageNet: A Large-Scale Hierarchical Image Database.", 2009 Institute of Electrical and Electronics Engineers Conference on Computer Vision and Pattern Recognition, Montreal, Quebec, Canada, Oct. 22-23, 2009, pp. 248-255.

Devlin et al., "BERT: Pre-training of Deep Bidirectional Transformers for Language Understanding.", arXiv:1810.04805v2, May 24, 2019, 16 pages.

Dosovitskiy et al., "An Image is Worth 16×16 Words: Transformers for Image Recognition at Scale.", arXiv:2010.11929v2, Jun. 3, 2021, 22 pages.

Dou et al., "An Empirical Study of Training End-to-End Vision-and-Language Transformers.", arXiv:2111.02387v3, Mar. 18, 2022, 15 pages.

Goyal et al., "Making the V in VQA Matter: Elevating the Role of Image Understanding in Visual Question Answering.", arXiv:1612.00837v3, May 15, 2017, 11 pages.

He et al., "Deep Residual Learning for Image Recognition.", arXiv:1512.03385v1, Dec. 10, 2015, 12 pages.

Hendricks et al., "Decoupling the Role of Data, Attention, and Losses in Multimodal Transformers.", arXiv:2102.00529v1, Jan. 31, 2021 15 pages.

Hudson et al., "GQA: A New Dataset for Real-World Visual Reasoning and Compositional Question Answering.", arXiv:1902.09506v3, May 10, 2019, 18 pages.

Jiang et al., "In Defense of Grid Features for Visual Question Answering.", arXiv:2001.03615v2, Apr. 2, 2020, 12 pages.

Kamath et al., "MDETR—Modulated Detection for End-to-End Multi-Modal Understanding.", arXiv:2104.12763v2, Oct. 12, 2021, 22 pages.

Kim et al., "ViLT: Vision- and-Language Transformer Without Convolution or Region Supervision.", arXiv:2102.03334v2, Jun. 10, 2021, 12 pages.

Kingma et al., "ADAM: A Method for Stochastic Optimization.", arXiv:1412.6980v9, Jan. 30, 2017, 15 pages.

Kottur, et al., "Visual Coreference Resolution in Visual Dialog Using Neural Module Networks.", arXiv:1809.01816v1, Sep. 6, 2018, 25 pages.

Krishna et al., "Visual Genome: Connecting Language and Vision Using Crowdsourced Dense Image Annotations.", arXiv:1602.07332v1, Feb. 23, 2016, 44 pages.

LeCun et al., "Gradient-based Learning Applied to Document Recognition.", Institute of Electrical and Electronics Engineers, vol. 86, No. 11, Nov. 1998, 47 pages.

Lee et al., "Stacked Cross Attention for Image-Text Matching.", arXiv:1803.08024v2, Jul. 23, 2018, 25 pages.

Li et al., "Align before Fuse: Vision and Language Representation Learning with Momentum Distillation.", arXiv:2107.07651v2, Oct. 7, 2021, 16 pages.

Li et al., "BLIP-2: Bootstrapping Language-Image Pre-training for Unified Vision-Language Understanding and Generation.", arXiv:2301.12597v3, Jun. 15, 2023, 13 pages.

Li et al., "Oscar: Object-Semantics Aligned Pre-training for Vision-Language Tasks.", arXiv:2004.06165v5, Jul. 26, 2020, 21 pages.

Li et al., "UNIMO: Towards Unified-Modal Understanding and Generation via Cross-Modal Contrastive Learning.", arXiv:2012.15409v4, Mar. 14, 2022, 16 pages.

Li et al., "VisualBERT: A Simple and Performant Baseline for Vision and Language.", arXiv:1908.03557v1, Aug. 9, 2019, 14 pages.

Lin et al., "Microsoft COCO: Common Objects in Context.", arXiv:1405.0312v3, Feb. 21, 2015, 15 pages.

Loshchilov et al., "SGDR: Stochastic Gradient Descent with Warm Restarts.", arXiv:1608.03983v5, May 3, 2017, 16 pages.

Lu et al., "12-in-1: Multi-Task Vision and Language Representation Learning.", arXiv:1912.02315v2, Apr. 24, 2020, 19 pages.

Lu et al., "Vilbert: Pretraining Task-Agnostic Visiolinguistic Representations for Vision- and-Language Tasks.", arXiv:1908.02265v1, Aug. 6, 2019, 11 pages.

Mao et al., "Generation and Comprehension of Unambiguous Object Descriptions.", arXiv:1511.02283v3, Apr. 11, 2016, 11 pages.

Nguyen et al., "Coarse-to-Fine Reasoning for Visual Question Answering.", arXiv:2110.02526v2, Apr. 19, 2022, 9 pages.

Nguyen et al., "Multi-Task Learning of Hierarchical Vision-Language Representation.", arXiv:1812.00500v1, Dec. 3, 2018, 10 pages.

Ordonez et al., "Im2Text: Describing Images Using 1 Million Captioned Photographs.", Twenty-fourth International Conference on Neural Information Processing Systems, Granada, Spain, Dec. 12-14, 2011, pp. 1143-1151.

Piergiovanni et al., Answer-Me: Multi-Task Open-Vocabulary Visual Question Answering. arXiv:2205.00949v2, Nov. 30, 2022, 20 pages.

Piergiovanni et al., "Video Question Answering with Iterative Video-Text Co-Tokenization.", arXiv:2208.00934v1, Aug. 1, 2022, 23 pages.

Raffel et al., "Exploring the Limits of Transfer Learning with a Unified Text-to-Text Transformer.", arXiv:1910.10683v4, Sep. 19, 2023, 67 pages.

Ren et al., "Faster R-CNN: Towards Real-Time Object Detection with Region Proposal Networks.", arXiv:1506.01497v3, 14 pages.

Ryoo et al., "TokenLearner: Adaptive Space-Time Tokenization for Videos.", Thirty-fifth Conference on Neural Information Processing Systems, Virtual, Dec. 6-14, 2021, 12 pages.

Sharma et al., "Conceptual Captions: A Cleaned, Hypernymed, Image Alt-text Dataset for Automatic Image Captioning.", Fifty-sixth Annual Meeting of the Association for Computational Linguistics (Long Papers), Melbourne, Australia, Jul. 15-20, 2018, pp. 2556-2565.

(56) References Cited

OTHER PUBLICATIONS

Suhr et al., "A Corpus of Natural Language for Visual Reasoning.", arXiv:1811.00491v3, Jul. 21, 2019, 22 pages.

Tan et al., "LXMERT: Learning Cross-Modality Encoder Representations from Transformers.", arXiv:1908.07490v3, Dec. 3, 2019, 14 pages.

Vaswani et al., "Attention Is All You Need.", Thirty-first Conference on Neural Information Processing Systems (NIPS 2017), Long Beach, California, United States, Dec. 4-9, 2017, 11 pages.

Wang et al., "Image as a Foreign Language: BEiT Pretraining for All Vision and Vision-Language Tasks.", arXiv:2208.10442v2, 18 pages.

Wang et al., "SimVLM: Simple Visual Language Model Pretraining with Weak Supervision.", arXiv:2108.10904v3, 17 pages.

Xie et al., "Visual Entailment: A Novel Task for Fine-Grained Image Understanding.", arXiv:1901.06706v1, Jan. 20, 2019, 12 pages.

Yu et al., "CoCa: Contrastive Captioners are Image-Text Foundation Models.", arXiv:2205.01917v2, Jun. 14, 2022, 19 pages.

Zellers et al., "From Recognition to Cognition: Visual Commonsense Reasoning.", arXiv:1811.10830, Mar. 26, 2019, 29 pages.

Zhang et al., "VinVL: Revisiting Visual Representations in Vision-Language Models.", arXiv:2101.00529v2, Mar. 10, 2021, 30 pages.

Zhou et al., "Unified Vision-Language Pre-Training for Image Captioning and VQA.", arXiv:1909.11059v3, Dec. 4, 2019, 10 pages.

* cited by examiner

CHANNEL FUSION FOR VISION-LANGUAGE REPRESENTATION LEARNING

RELATED APPLICATIONS

This application claims priority to and the benefit of U.S. Provisional Patent Application No. 63/410,474, filed Sep. 27, 2023. U.S. Provisional Patent Application No. 63/410,474 is hereby incorporated by reference in its entirety.

FIELD

The present disclosure relates generally to machine learning. More particularly, the present disclosure relates to systems and methods for fusing visual and language representations for several visuo-linguistic tasks.

BACKGROUND

Multi-modal learning and understanding will play an increasingly central role for the development of general purpose artificial agents. Visuo-linguistic tasks such as visual reasoning, visual entailing, and visual question answering (VQA), have emerged as effective frameworks for multimodal learning and require a thorough understanding of both visual and textual information.

These tasks have witnessed significant progress in recent years. A common strategy has been to use self-attention on a sequence-wise concatenation of the per-modality tokens. Other works use cross-attention between the tokens. For example, one work samples latent representations from the visual tokens before using cross-attention between the text-tokens and the latent tokens.

However, architectures based on sequence-wise concatenation followed by self-attention may struggle to effectively align complementary tokens across the different modalities. For example, basic concatenation fails to provide any alignment of tokens between different modalities. On the other hand, purely-cross-attention-based models forfeit the benefits of global self-attention across all tokens.

SUMMARY

Aspects and advantages of embodiments of the present disclosure will be set forth in part in the following description, or can be learned from the description, or can be learned through practice of the embodiments.

One example aspect of the present disclosure is directed to a computer system for performance of visuo-linguistic processing. The computer system includes one or more processors and one or more non-transitory computer-readable media that collectively store a machine-learned visuo-linguistic model. The machine-learned visuo-linguistic model comprises one or more multi-modal fusion layers. Each multi-modal fusion layer is configured to: obtain a plurality of vision embedding tokens and a plurality of text embedding tokens; perform cross-attention using the plurality of vision embedding tokens as queries and the plurality of text embedding tokens as keys and values to generate a plurality of text-to-vision intermediate tokens; concatenate the plurality of text-to-vision intermediate tokens with the plurality of vision embedding tokens in a channel-wise fashion to generate a plurality of text-to-vision compound tokens; perform cross-attention using the plurality of text embedding tokens as queries and the plurality of vision embedding tokens as keys and values to generate a plurality of vision-to-text intermediate tokens; and concatenate the plurality of vision-to-text intermediate tokens with the plurality of text embedding tokens in a channel-wise fashion to generate a plurality of vision-to-text compound tokens.

Another example aspect of the present disclosure is directed to a computer system for multi-modal processing. The computer system includes one or more processors and one or more non-transitory computer-readable media that collectively store a machine-learned multi-modal model. The machine-learned multi-modal model comprises one or more multi-modal fusion layers. Each multi-modal fusion layer is configured to: obtain a plurality of first embedding tokens associated with a first data modality; obtain a plurality of second embedding tokens associated with a second data modality that is different from the first data modality; perform cross-attention using the plurality of first embedding tokens as queries and the plurality of second embedding tokens as keys and values to generate a plurality of second-to-first intermediate tokens; concatenate the plurality of second-to-first intermediate tokens with the plurality of first embedding tokens in a channel-wise fashion to generate a plurality of second-to-first compound tokens; perform cross-attention using the plurality of second embedding tokens as queries and the plurality of first embedding tokens as keys and values to generate a plurality of first-to-second intermediate tokens; and concatenate the plurality of first-to-second intermediate tokens with the plurality of second embedding tokens in a channel-wise fashion to generate a plurality of first-to-second compound tokens.

Another example aspect of the present disclosure is directed to a computer system for multi-modal processing. The computer system includes one or more processors and one or more non-transitory computer-readable media that collectively store a machine-learned multi-modal model. The machine-learned multi-modal model comprises one or more multi-modal fusion layers. Each multi-modal fusion layer is configured to: obtain a plurality of first embedding tokens associated with a first data modality; obtain a plurality of second embedding tokens associated with a second data modality that is different from the first data modality; perform cross-attention using the plurality of first embedding tokens as queries and the plurality of second embedding tokens as keys and values to generate a plurality of second-to-first intermediate tokens; and concatenate the plurality of second-to-first intermediate tokens with the plurality of first embedding tokens in a channel-wise fashion to generate a plurality of second-to-first compound tokens.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
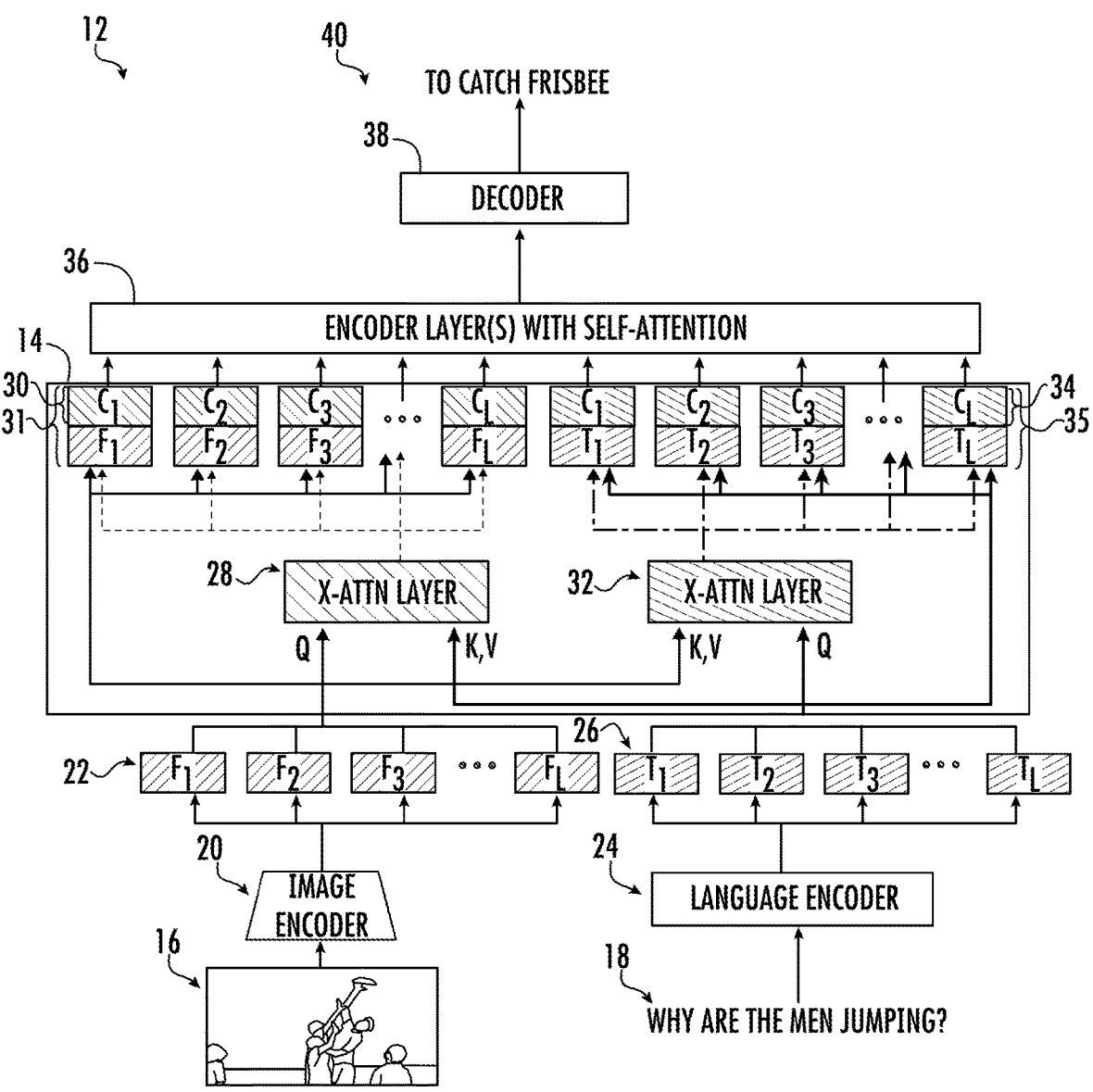
FIG. 1A depicts a block diagram of an example machine-learned visuo-linguistic model that includes a multi-modal fusion layer according to example embodiments of the present disclosure.

Reference numerals that are repeated across plural figures are intended to identify the same features in various implementations.

DETAILED DESCRIPTION

Overview

Generally, the present disclosure is directed to effective and efficient method for fusing visual and language representations for several question answering tasks including visual question answering, and visual entailment. In contrast to prior works that concatenate unimodal representations or use only cross-attention, example model architectures described herein can compose multi-modal representations via channel fusion. By fusing on the channels, the model is able to more effectively align the tokens compared to simple sequence-wise concatenation. These multi-modal representations, which can be referred to as "compound tokens", can be generated with cross-attention transformer layers. Specifically, in one aspect, vision tokens can be used as queries to retrieve compatible text tokens through cross-attention. The vision tokens and the queried text tokens can then be concatenated along the channel dimension. The resulting representations can be referred to as text-to-vision compound tokens. Similarly, vision-to-text compound tokens can be generated using an analogous process where the text tokens serve as queries to the cross-attention layer and the vision tokens serve as the keys and values. Further, in some implementations, the vision-to-text compound tokens and the text-to-vision compound tokens can be concatenated for further processing with self-attention layers. Example implementations demonstrate the effectiveness of compound tokens using an encoder-decoder vision-language model trained end-to-end in an open vocabulary setting. Compound Tokens achieve highly competitive performance across a range of question answering tasks including GQA, VQA2.0, and SNLI-VE.

More particularly, the present disclosure provides an approach that aligns multi-modal tokens using cross-attention without losing the advantages of global self-attention. In contrast to previous works that concatenate the unimodal tokens along the sequence dimension, example approaches described herein align per-modality tokens by chaining them along the channels. Specifically, the tokens from one modality can be used to query the other modality and the output can be concatenated with the query tokens on the channels. An analogous process can also be repeated (or performed in parallel) where the roles of the two modalities are switched. The resulting sets of compound tokens can be concatenated and fed into a self-attention encoder (such as a transformer encoder that performs self-attention).

Combining the query features and the cross-attention outputs on the channels does not increase the token length, thus eliminating any additional computational or memory overheads in the multimodal transformer, and decoder modules. To further ensure that the method is efficient, some example implementations can first embed each modality into half of their original feature dimension before compounding them. Other ways of mixing the query inputs and the cross-attention outputs such as weighting or element-wise products are less effective compared to channel concatenation.

The compound tokens were evaluated through extensive experiments in various settings. Compound Tokens fusion outperforms both merged attention and co-attention on GQA (Hudson & Manning, 2019), SNLI-VE (Xie et al., 2019), and VQA (Goyal et al., 2017), with and without vision-language pretraining. The proposed model also outperforms several equally sized works such as ALBEF (Li et al., 2021a), METER (Dou et al., 2022), and BLIP (Li et al., 2022), on SNLI-VE and GQA, despite using an open vocabulary evaluation.

Thus, the present disclosure provides a novel multi-modal fusion method for vision-language tasks that enjoys the benefits of both cross-attention and self-attention without substantial additional computational overhead. The proposed method is efficacious for several question answering tasks. Furthermore, the proposed framework is easily scalable and can be extended to include other modalities such as audio data, sensor data, tabular data, or other modalities of data that may be transformed into embeddings in an embedding space.

The systems and methods of the present disclosure provide several technical effects and benefits that enhance the performance and efficiency of multi-modal processing in computer systems. An important technical effect of the invention is the optimized alignment of multi-modal tokens using cross-attention, which results in more effective and efficient processing of these tokens. This is in contrast to previous methods which concatenated unimodal tokens along the sequence dimension, often resulting in increased computational overhead and memory usage. By chaining the tokens along the channels instead, the system can align per-modality tokens more efficiently, thereby reducing computational load and memory usage.

Another significant technical effect of the invention is its ability to retain the advantages of global self-attention, while aligning the multi-modal tokens. The alignment of tokens is carried out in such a way that the advantages of global self-attention are not lost, thereby resulting in a more effective and efficient processing of the tokens. This technical effect is achieved by using the tokens from one modality to query the other modality, and then concatenating the output with the query tokens on the channels. This process can be repeated or performed in parallel, where the roles of the two modalities are switched. The resulting compound tokens can then be processed using self-attention, thereby maintaining the benefits of global self-attention.

Further, the disclosed invention provides a technical benefit in the form of reduced computational overhead. The combination of query features and cross-attention outputs on the channels does not necessarily increase the token length, thus eliminating any additional computational or memory overheads in the multimodal transformer and decoder modules. This makes the system more efficient and capable of processing larger amounts of data.

Another technical benefit of the invention is the ability to extend the framework to include other modalities such as audio data, sensor data, tabular data, or other types of data that can be transformed into embeddings in an embedding space. This provides the system with the ability to process a wider range of data types, thereby making it more versatile and adaptable to various application scenarios.

With reference now to the Figures, example embodiments of the present disclosure will be discussed in further detail.

EXAMPLE MODELS

Example Background Notation

Attention: Given a set of query vectors $Q \in \mathbb{R}^{N \times d}$ and a set of key vectors $K \in \mathbb{R}^{M \times d}$ an attention layer gathers information from context vectors $V \in \mathbb{R}^{M \times c}$ proportional to the normalized scores between the elements of Q and K. Specifically, for softmax dot-product attention, the scalar output $z_{i,\ell}$, of an attention layer for query vector $q_i \in Q$ and key vector $k_j \in K$, is the weighted sum of the elements of V, $$a_{i,j} = \frac{q_i^T k_j}{\sqrt{d}} \quad \alpha_{i,j} = \frac{\exp(a_{i,j})}{\sum_\ell \exp(a_{i,\ell})} \quad z_{i,\ell} = \sum_j \alpha_{i,j} V_{j,\ell}. \tag{1}$$

An attention mechanism is called self-attention when the query vectors are also members of the context vectors, i.e., $q_i \in K \forall i$. It is known as cross-attention otherwise.

Multimodal Fusion: Token concatenation followed by self-attention is one of the most adopted approaches for cross-modal learning in recent vision-language architectures. Formally, given a sequence of N image tokens, $\mathcal{I} \in \mathbb{R}^{N \times d}$ and M text tokens, $\mathcal{T} \in \mathbb{R}^{M \times d}$, most methods concatenate $\mathcal{I}$ and $\mathcal{T}$ into a single representation $\mathcal{O} \in \mathbb{R}^{(N+M) \times d}$ which is then fed into a multimodal transformer for further modeling. The target outputs are produced using either a linear layer or a decoder. Besides concatenation, other methods use multimodal transformers composed of both self-attention and cross-attention in every block.

Example Proposed Fusion Techniques

Some example implementations can operate as follows. A computing system can perform compound tokens fusion to project the visual and language tokens into half of the embedding space so that the total number of features is maintained after channel concatenation:

$$\mathcal{I} \in \mathbb{R}^{N \times \frac{d}{2}}; \mathcal{T} \in \mathbb{R}^{M \times \frac{d}{2}}$$

for the image and text tokens respectively. Next, the computing system can employ some number (e.g., only two) of cross-attention layers (e.g., unlike co-attention that uses cross-attention and self-attention in every block) to create visual and language compound tokens $$\hat{\mathcal{I}} = \mathcal{A}(\mathcal{I}, \mathcal{T}, \mathcal{T}) \in \mathbb{R}^{N \times \frac{d}{2}} \quad \hat{\mathcal{T}} = \mathcal{A}(\mathcal{T}, \mathcal{I}, \mathcal{I}) \in \mathbb{R}^{M \times \frac{d}{2}} \tag{2}$$

$$\mathcal{I}_{cmpd} = C\text{-}Concat(\hat{\mathcal{I}}, \mathcal{I}) \in \mathbb{R}^{N \times d} \tag{3}$$

$$\mathcal{T}_{cmpd} = C\text{-}Concat(\hat{\mathcal{T}}, \mathcal{T}) \in \mathbb{R}^{M \times d}$$

where $\mathcal{A}$ (q,k,v) is the cross-attention function with q, k, and v as queries, keys, and values respectively. C−Concat(u,v)

concatenates tensors u and v along the feature dimension. Some example implementations combine vision-to-text compound tokens $\mathcal{I}_{cmpd}$, and text-to-vision compound tokens $\mathcal{T}_{cmpd}$, into a set of output compound tokens as in merged attention architectures:

$$O_{cmpd} = Concat(\mathcal{I}_{cmpd}, \mathcal{T}_{cmpd}) \in \mathbb{R}^{(N+M) \times d}. \tag{4}$$

Some example implementations feed $O_{cmpd}$ into a self-attention multimodal encoder before generating the target outputs with an auto-regressive decoder. Other implementations do not use a multimodal encoder: $O_{cmpd}$ can be passed directly into the decoder to produce the outputs.

Example Model Visualizations

FIG. 1A depicts a block diagram of an example machine-learned visuo-linguistic model 12 that includes a multi-modal fusion layer 14 according to example embodiments of the present disclosure.

Specifically, as illustrated in FIG. 1A, the machine-learned visuo-linguistic model 12 can be configured to receive an image input 16 and a text input 18. The machine-learned visuo-linguistic model 12 can include an image encoder 20 that processes the image input 16 to generate plurality of vision embedding tokens 22. The number of vision embedding tokens 22 can be referred to as the channel depth for the channel dimension of the vision embedding tokens. For example, while four vision embedding tokens 22 are illustrated (e.g., the channel dimension for the illustrated vision embeddings has a depth of four), any number of vision embedding tokens 22 can be generated.

Likewise, the machine-learned visuo-linguistic model 12 can include a language encoder 24 that processes the text input 18 to generate a plurality of text embedding tokens 26. The number of text embedding tokens 26 can be referred to as the channel depth for the channel dimension of the text embedding tokens. For example, while four text embedding tokens 26 are illustrated (e.g., the channel dimension for the illustrated text embeddings has a depth of four), any number of text embedding tokens 26 can be generated. The number of text embedding tokens 26 may equal the number of vision embedding tokens 22; or the number of text embedding tokens 26 may not equal the number of vision embedding tokens 22.

The multi-modal fusion layer 14 can perform cross-attention 28 using the plurality of vision embedding tokens 22 as queries and the plurality of text embedding tokens 26 as keys and values to generate a plurality of text-to-vision intermediate tokens 30. The multi-modal fusion layer 14 can concatenate the plurality of text-to-vision intermediate tokens 30 with the plurality of vision embedding tokens 22 in a channel-wise fashion to generate a plurality of text-to-vision compound tokens 31.

The multi-modal fusion layer 14 can perform cross-attention 32 using the plurality of text embedding tokens 26 as queries and the plurality of vision embedding tokens 22 as keys and values to generate a plurality of vision-to-text intermediate tokens 34. The multi-modal fusion layer 14 can concatenate the plurality of vision-to-text intermediate tokens 34 with the plurality of text embedding tokens 26 in a channel-wise fashion to generate a plurality of vision-to-text compound tokens 35.

The machine-learned visuo-linguistic model 12 can concatenate the plurality of text-to-vision compound tokens 31 and the plurality of vision-to-text compound tokens 35 to form a first set of output compound tokens. The machine-learned visuo-linguistic model 12 can further include one or more self-attention layers 36 configured to perform self-attention on the first set of output compound tokens to generate a second set of output compound tokens. The machine-learned visuo-linguistic model can further include a decoder 38 configured to process the second set of output compound tokens generate a prediction 40 for a visuo-linguistic task.

As examples, the visuo-linguistic task can be: a visual question answering task, a visual reasoning task, a visual entailment task, and/or other tasks that require visuo-linguistic understanding or processing.

Although the machine-learned visuo-linguistic model 12 illustrated in FIG. 1A contains only a single multi-modal fusion layer 14, in other implementations multiple multi-modal fusion layers can be included in the model. For example, the multiple multi-modal fusion layers can be stacked in a sequence one after another. The output from each layer can be provided as the input to the next layer. Additional operations may also be performed in each layer or in between layers such as pooling, normalization, residual connections and/or the like.

Further, in alternative example implementations, the decoder 38 may operate directly on the first set of output compound tokens (e.g., the plurality of text-to-vision compound tokens 31 and the plurality of vision-to-text compound tokens 35) to generate the prediction 40 for the visuo-linguistic task.

In addition, while FIG. 1A and various other portions of the present disclosure focus for the sake of explication on visuo-linguistic processing (e.g., the combined processing of the image input 16 and the text input 18), the proposed architecture is equally applicable to processing of multi-modal data for various combinations of other data modalities beyond just image and text, including, but not limited to, audio data, tabular data, sensor data, statistical data, time-series data, and/or any other form of data that can be transformed into embedding tokens within an embedding space.

Figure 1B:
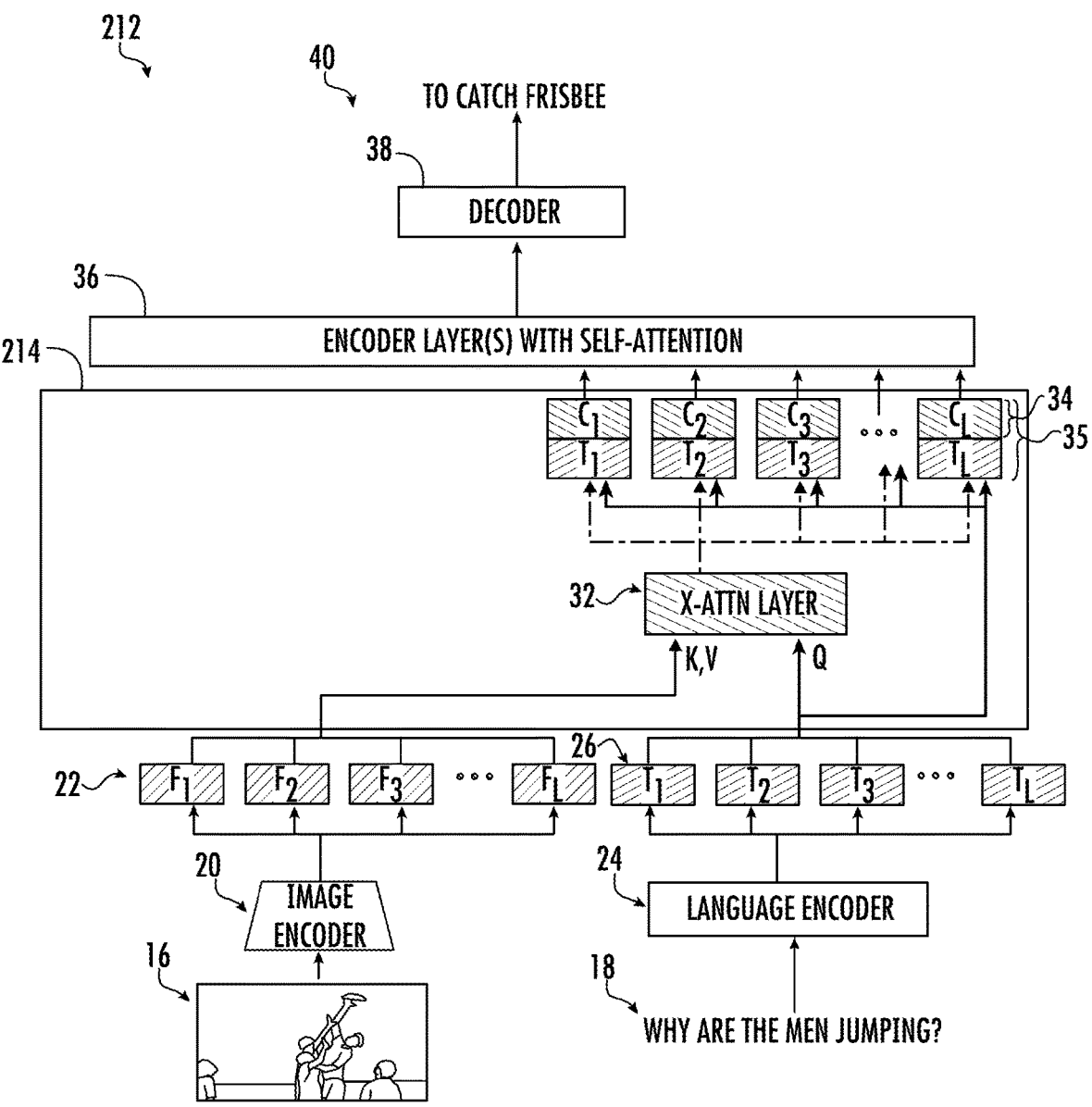
FIG. 1B depicts a block diagram of an example machine-learned visuo-linguistic model that includes a multi-modal fusion layer according to example embodiments of the present disclosure.

FIG. 1B depicts a block diagram of another example machine-learned visuo-linguistic model 212 that includes an alternative, more efficient multi-modal fusion layer 214 according to example embodiments of the present disclosure.

Specifically, the model 212 and the fusion layer 214 illustrated in FIG. 1B are highly similar to the model 12 and the fusion layer 14 illustrated in FIG. 1A, with the exception that the fusion layer 214 performs only the cross-attention 32 using the plurality of text embedding tokens 26 as queries and the plurality of vision embedding tokens 22 as keys and values to generate a plurality of vision-to-text intermediate tokens 34. That is, the fusion layer 214 does not perform the cross-attention 28 shown in FIG. 1A.

Referring again to FIG. 1B, the multi-modal fusion layer 214 can concatenate the plurality of text-to-vision intermediate tokens 34 with the plurality of text embedding tokens 26 in a channel-wise fashion to generate a plurality of vision-to-text compound tokens 35. The encoder layer(s) 36 can process the plurality of vision-to-text compound tokens 35. In other implementations, the decoder 38 can directly process the plurality of vision-to-text compound tokens 35.

Further, although FIG. 1B shows the fusion layer 214 performing only the cross-attention 32 using the plurality of text embedding tokens 26 as queries and the plurality of vision embedding tokens 22 as keys and values, the opposite arrangement is possible. That is, an alternative fusion layer 214 may perform (e.g., only) the cross-attention 28 shown in FIG. 1A but not the cross-attention 32 shown in FIGS. 1A and 1B.

Example Devices and Systems

Figure 2A:
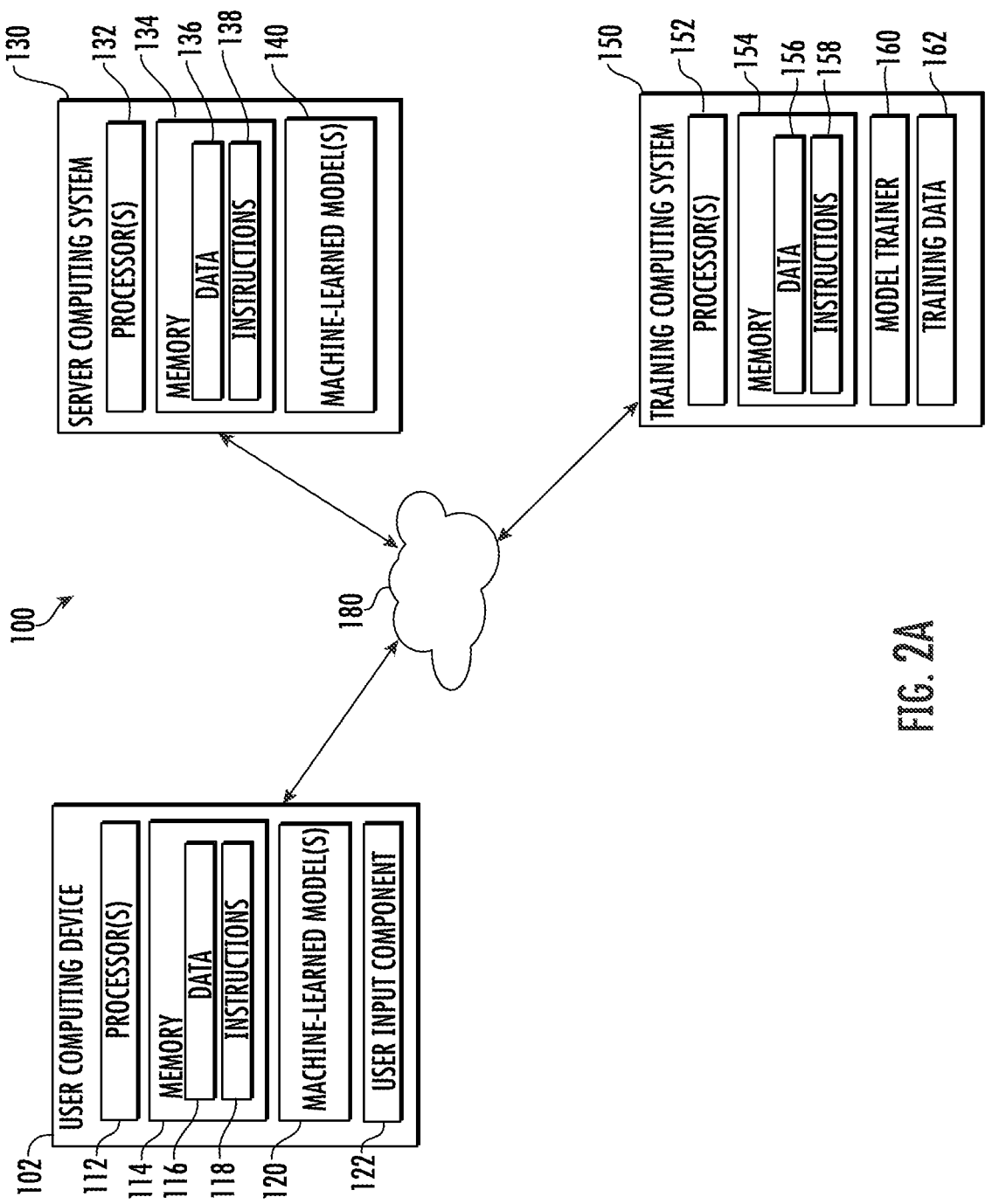
FIG. 2A depicts a block diagram of an example computing system according to example embodiments of the present disclosure.

FIG. 2A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1A and 1B.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel multi-modal processing across multiple instances of multi-modal inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a multi-modal processing service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1A and 1B.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, labelled training examples where each training example comprises multi-modal inputs (e.g., image and text inputs) and a label indicating a ground truth answer to a multi-modal task (e.g., a visuo-linguistic task).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2B:
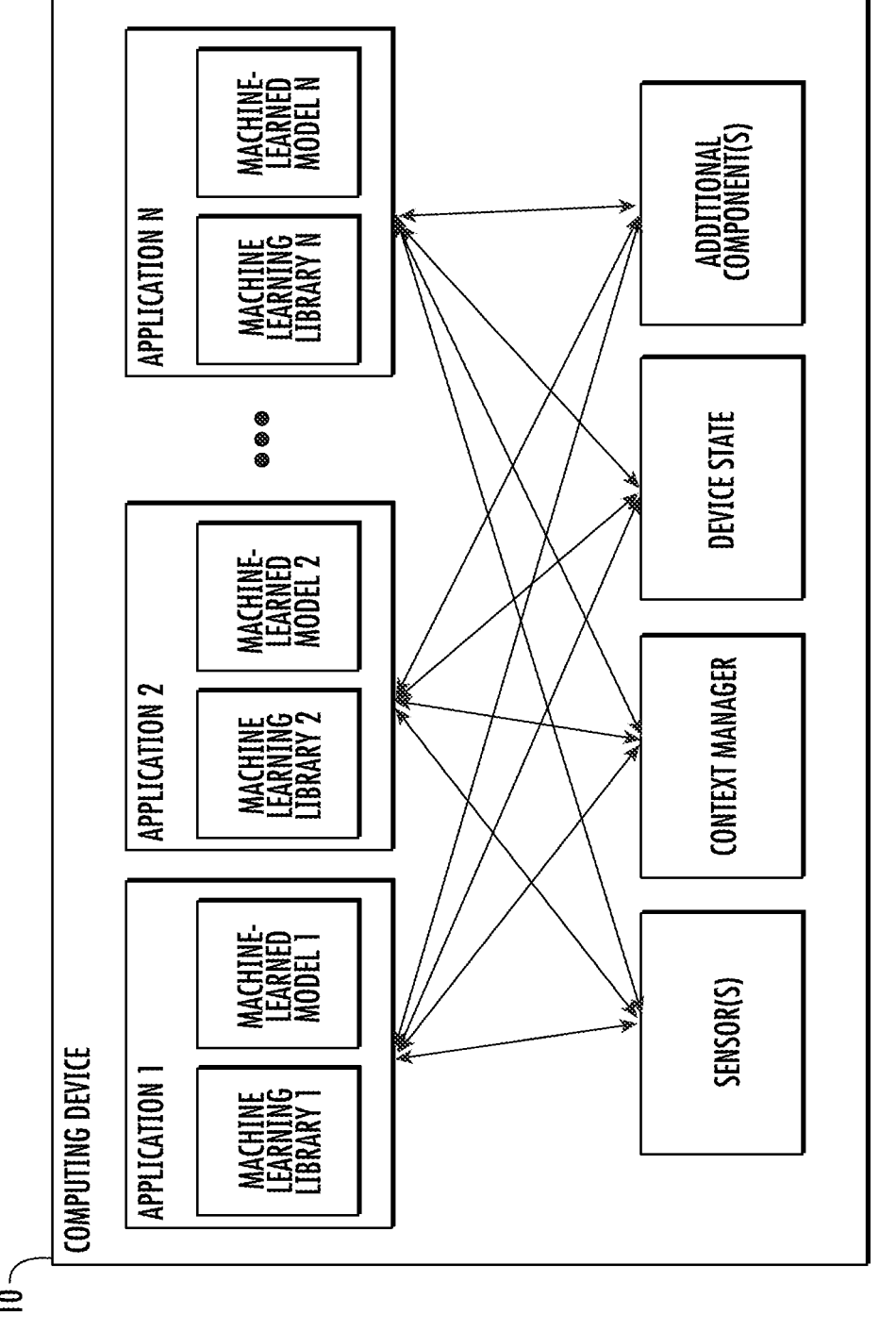
FIG. 2B depicts a block diagram of an example computing device according to example embodiments of the present disclosure.

FIG. 2B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
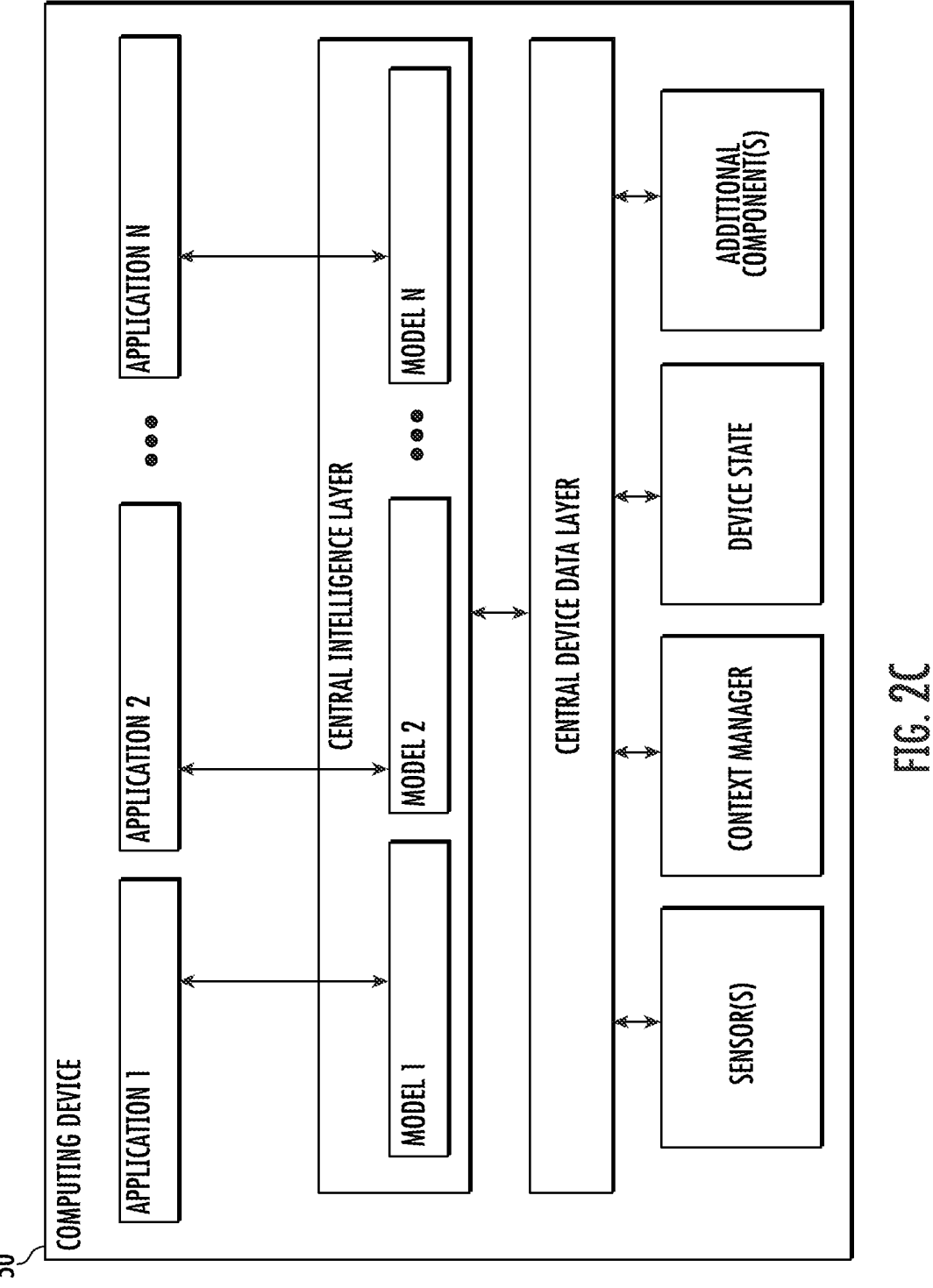
FIG. 2C depicts a block diagram of an example computing device according to example embodiments of the present disclosure.

FIG. 2C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system for performance of visuo-linguistic processing, the computer system comprising:

one or more processors; and one or more non-transitory computer-readable media that collectively store a machine-learned visuo-linguistic model, the machine-learned visuo-linguistic model comprising one or more multi-modal fusion layers, each multi-modal fusion layer configured to:

obtain a plurality of vision embedding tokens and a plurality of text embedding tokens;

perform cross-attention using the plurality of vision embedding tokens as queries and the plurality of text embedding tokens as keys and values to generate a plurality of text-to-vision intermediate tokens;

concatenate the plurality of text-to-vision intermediate tokens with the plurality of vision embedding tokens in a channel-wise fashion to generate a plurality of text-to-vision compound tokens;

perform cross-attention using the plurality of text embedding tokens as queries and the plurality of vision embedding tokens as keys and values to generate a plurality of vision-to-text intermediate tokens; and concatenate the plurality of vision-to-text intermediate tokens with the plurality of text embedding tokens in a channel-wise fashion to generate a plurality of vision-to-text compound tokens.

2. The computer system of claim 1, wherein the machine-learned visuo-linguistic model is configured to concatenate the plurality of text-to-vision compound tokens and the plurality of vision-to-text compound tokens to form a first set of output compound tokens.

3. The computer system of claim 2, wherein the machine-learned visuo-linguistic model further comprises one or more self-attention layers configured to perform self-attention on the first set of output compound tokens to generate a second set of output compound tokens.

4. The computer system of claim 3, wherein the machine-learned visuo-linguistic model further comprises a decoder configured to process the second set of output compound tokens to generate a prediction for a visuo-linguistic task.

5. The computer system of claim 4, wherein the visuo-linguistic task comprises: a visual question answering task, a visual reasoning task, or a visual entailment task.

6. The computer system of claim 2, wherein the machine-learned visuo-linguistic model further comprises a decoder configured to process the first set of output compound tokens generate a prediction for a visuo-linguistic task.

7. A computer system for multi-modal processing, the computer system comprising:

one or more processors; and one or more non-transitory computer-readable media that collectively store a machine-learned multi-modal model, the machine-learned multi-modal model comprising one or more multi-modal fusion layers, each multi-modal fusion layer configured to:

obtain a plurality of first embedding tokens associated with a first data modality;

obtain a plurality of second embedding tokens associated with a second data modality that is different from the first data modality;

perform cross-attention using the plurality of first embedding tokens as queries and the plurality of second embedding tokens as keys and values to generate a plurality of second-to-first intermediate tokens;

concatenate the plurality of second-to-first intermediate tokens with the plurality of first embedding tokens in a channel-wise fashion to generate a plurality of second-to-first compound tokens;

perform cross-attention using the plurality of second embedding tokens as queries and the plurality of first embedding tokens as keys and values to generate a plurality of first-to-second intermediate tokens; and concatenate the plurality of first-to-second intermediate tokens with the plurality of second embedding tokens in a channel-wise fashion to generate a plurality of first-to-second compound tokens.

8. The computer system of claim 7, wherein the machine-learned multi-modal model is configured to concatenate the plurality of second-to-first compound tokens and the plurality of first-to-second compound tokens to form a first set of output compound tokens.

9. The computer system of claim 8, wherein the machine-learned multi-modal model further comprises one or more self-attention layers configured to perform self-attention on the first set of output compound tokens to generate a second set of output compound tokens.

10. The computer system of claim 9, wherein the machine-learned multi-modal model further comprises a decoder configured to process the second set of output compound tokens generate a prediction for a multi-modal task.

11. The computer system of claim 8, wherein the machine-learned multi-modal model further comprises a decoder configured to process the first set of output compound tokens generate a prediction for a multi-modal task.

12. The computer system of claim 7, wherein the first modality comprises visual data and the second modality comprises textual data.

13. The computer system of any of claim 7, wherein the first modality comprises visual data and the second modality comprises audio data.

14. The computer system of any of claim 7, wherein the first modality comprises audio data and the second modality comprises textual data.

15. A computer system for multi-modal processing, the computer system comprising:

one or more processors; and one or more non-transitory computer-readable media that collectively store a machine-learned multi-modal model, the machine-learned multi-modal model comprising one or more multi-modal fusion layers, each multi-modal fusion layer configured to:

obtain a plurality of first embedding tokens associated with a first data modality;

obtain a plurality of second embedding tokens associated with a second data modality that is different from the first data modality;

perform cross-attention using the plurality of first embedding tokens as queries and the plurality of second embedding tokens as keys and values to generate a plurality of second-to-first intermediate tokens; and concatenate the plurality of second-to-first intermediate tokens with the plurality of first embedding tokens in a channel-wise fashion to generate a plurality of second-to-first compound tokens;

wherein the machine-learned multi-modal model further comprises a decoder configured to process the plurality of second-to-first compound tokens to generate a prediction for a multi-modal task.

16. The computer system of any of claim 15, wherein:

the first modality comprises visual data and the second modality comprises textual data; or the first modality comprises textual data and the second modality comprises visual data.

17. The computer system of any of claim 15, wherein:

the first modality comprises visual data and the second modality comprises audio data;

the first modality comprises audio data and the second modality comprises visual data;

the first modality comprises audio data and the second modality comprises textual data; or the first modality comprises textual data and the second modality comprises audio data.

18. A computer system for multi-modal processing, the computer system comprising:

one or more processors; and one or more non-transitory computer-readable media that collectively store a machine-learned multi-modal model, the machine-learned multi-modal model comprising one or more multi-modal fusion layers, each multi-modal fusion layer configured to:

obtain a plurality of first embedding tokens associated with a first data modality;

obtain a plurality of second embedding tokens associated with a second data modality that is different from the first data modality;

perform cross-attention using the plurality of first embedding tokens as queries and the plurality of second embedding tokens as keys and values to generate a plurality of second-to-first intermediate tokens; and concatenate the plurality of second-to-first intermediate tokens with the plurality of first embedding tokens in a channel-wise fashion to generate a plurality of second-to-first compound tokens;

wherein the machine-learned multi-modal model further comprises one or more self-attention layers configured to perform self-attention on the plurality of second-to-first compound tokens to generate a set of output compound tokens; and wherein the machine-learned multi-modal model further comprises a decoder configured to process the set of output compound tokens to generate a prediction for a multi-modal task.

* * * * *